United States Patent Office 3,064,029
Patented Nov. 13, 1962

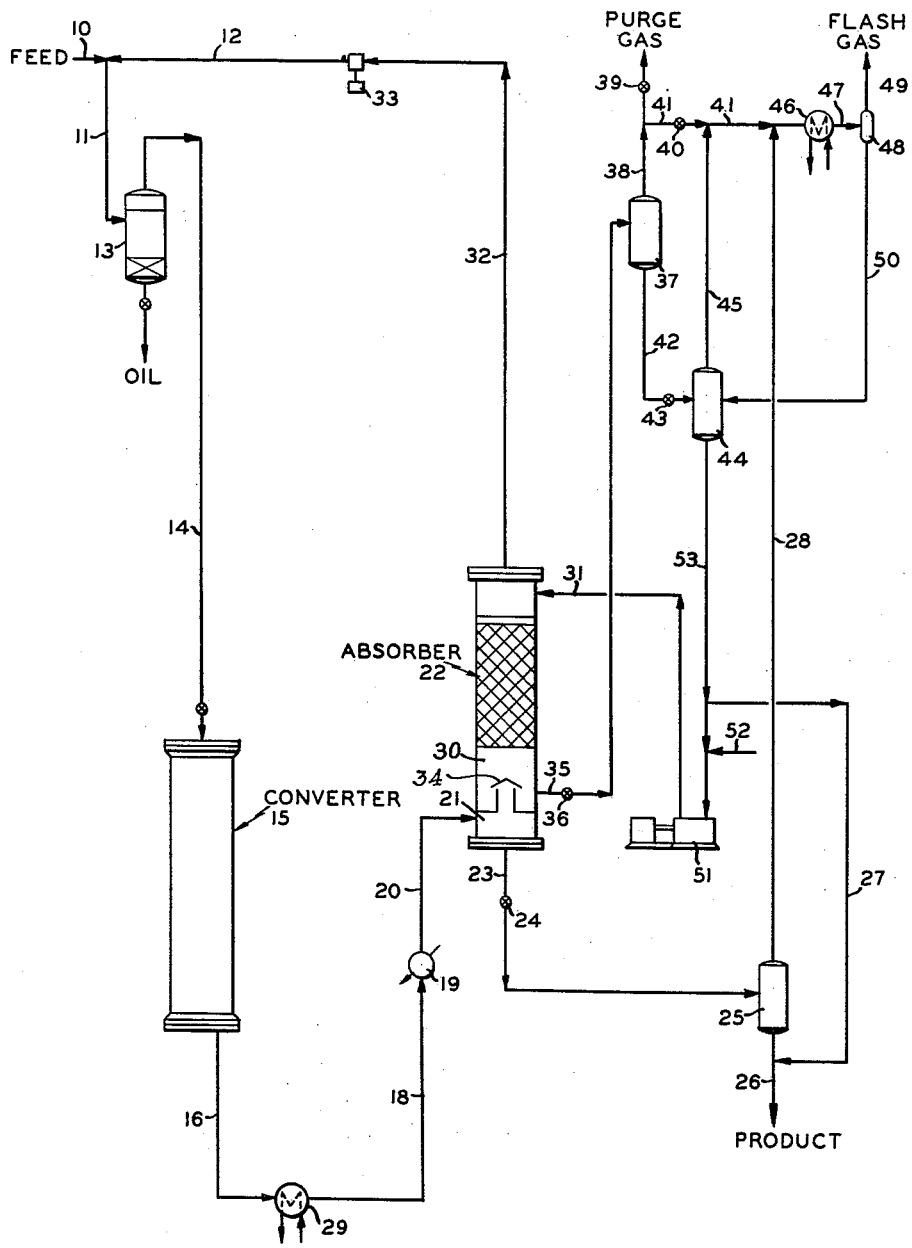

3,064,029
GAS SEPARATION
Thomas Clarence White, Union City, N.J., assignor to The M. W. Kellogg Company, Jersey City, N.J., a corporation of Delaware
Filed Dec. 15, 1958, Ser. No. 780,546
8 Claims. (Cl. 260—449.5)

This invention relates to a method of separating gaseous components from a mixture containing the same. In one of its aspects this invention relates to a process for selectively purging inert gaseous components from a gaseous stream.

A number of processes for the conversion of synthesis gas to valuable products are in use today. Illustrative of such processes are the preparation of ammonia from mixtures of hydrogen and nitrogen, the preparation of oxygenated organic compounds, such as methanol, from mixtures of hydrogen and carbon oxides and the preparation of urea from mixtures of ammonia and carbon dioxide. Most of the reactions are highly exothermic Hence, it is an accepted practice to use a large excess of one of the reactants, in addition to inert gases, in order to facilitate temperature control. The use of a large excess of reactant gas requires the use of a recycle stream for efficient operation. However, during the reaction period a number of inert by-products are formed. In order to prevent the build-up of these inert by-products, and other inert gases introduced with the feed material, in the recycle stream, i.e., in order to control the concentration of recycled inert materials, most processes provide for the purging of a fixed percentage of the total recycle stream. This practice of purging a portion of the total recycle stream has the serious disadvantage that it is non-selective. In other words, valuable reactant gases as well as product are also purged. The over-all efficiency of any process employing this purging technique is obviously decreased.

It is an object of this invention to provide an efficient process for converting synthesis gas to valuable products.

It is another object of this invention to provide an efficient process for purging inert materials from a recycle stream.

It is another object of this invention to provide a process for controlling the concentration of inert materials in a synthesis gas recycle stream.

Various other objects and advantages of the present invention will become apparent on reading the accompanying description and disclosure.

In accordance with the present invention, a product stream containing a condensable product and a mixture of reactive and inert gases is withdrawn from the reaction zone. The reaction zone is maintained at reaction temperature and usually at an elevated pressure. The withdrawn product stream is cooled to condense substantially all of the condensable product at approximately reactor pressure. The condensed product is separated from the uncondensed mixture of inert and reactive gases. The uncondensed mixture of gases, with or without further cooling, is then contacted at approximately reactor pressure in an absorption zone with an absorbent which absorbs a portion of the inert materials. A gaseous mixture containing reactant gases and a reduced quantity of non-reactant or inert gases is withdrawn from contact with the absorbent and is recycled to the reaction zone. Since the absorbent becomes less effective as the concentration of absorbed gases increases, it should be treated for the removal of inert gases if it is to be recycled to the absorption zone. Since synthesis reactions are usually conducted at an elevated pressure, a preferred method for regenerating the absorbent comprises flashing the absorbed gases at a reduced pressure. Preferably, the absorbent containing inert gases is flashed through a plurality of zones at successively lower pressures since the use of more than one flash zone minimizes the loss of absorbent. The stripped or lean absorbent is then repressured and recycled to the absorption zone.

For purposes of illustration, the invention will be further described with reference to the preparation of methanol by the reaction of hydrogen with carbon oxides. From this illustration, it will be apparent that the invention is generally applicable to those processes where inert or non-reactive gases are to be purged from a reactor effluent stream containing these gases in admixture with condensable products and reactive gases.

In the synthesis of methanol, hydrogen and carbon oxides are reacted at elevated temperatures and pressures in the presence of a catalyst. The hydrogen-carbon oxide mixture is obtained by the partial oxidation of normally gaseous to light liquid hydrocarbons, by steam reforming of these hydrocarbons or by a combination of partial combustion and steam reforming processes.

The gas resulting from either of these processes contains hydrogen and carbon monoxide in addition to a number of other by-products of the reaction. This gas mixture is accordingly treated to increase the concentration of hydrogen and carbon monoxide. In addition, since an excess of hydrogen above the theoretical 2:1 hydrogen to carbon monoxide ratio is required, a portion of the hydrogen-carbon monoxide mixture is usually subjected to a water gas shift reaction to increase the hydrogen ratio. Since large excesses of hydrogen are employed (on a hydrogen-carbon monoxide basis), fairly large quantities of carbon dioxide can be tolerated in the synthesis gas. Other components of the synthesis gas mixture include methane, a product of both the steam reforming and partial oxidation reactions, and argon, where the synthesis gas is prepared by partial combustion. In any event, the synthesis feed gas is admixed with a recycle stream containing a high proportion of hydrogen together with other inert gases, such as methane, which serve to dilute the reactant mixture thereby facilitating temperature control of the highly exothermic reaction.

The admixed synthesis feed gas and recycle gas is then introduced into the reaction zone. For the preparation of methanol, the reaction zone is maintained at a temperature above 437° F. and usually between about 572° F. and 710° F. Reaction pressure is maintained above 3000 p.s.i.g. and usually between about 4000 and about 6000 p.s.i.g. The reaction is carried out in the presence of a catalyst. A number of metals, metal oxides and salts of the metals are suitable in the methanol synthesis. The usual commercial catalyst is composed of a mixture of zinc oxide and chromium oxide, containing between 25 and 75 weight percent of zinc oxide.

The effluent from the methanol synthesis converter contains, in addition to methanol, water, methane, dimethyl ether and relatively small concentrations of higher alcohols and other gaseous hydrocarbons. The reactor effluent is cooled to condense the normally liquid components. In the case of methanol synthesis, the effluent is cooled to a temperature between about 80° F. and about 125° F. Condensed methanol contaminated with water is separated from the uncondensed gases and is further purified by standard procedures. The uncondensed gases, which are still at substantially reactor pressure, may be cooled further prior to being treated in the absorption zone. Further cooling increases the efficiency of the absorption process. Where the uncondensed gases are further cooled, they are cooled to a temperature above the freezing point of the principal impurity, e.g., methane, and preferably a temperature above −50° F. Treatment of the uncondensed mixture of reactive and inert gases may therefore be carried out at a temperature between about −50° F. and about 125° F. The gas mixture is then treated in an absorption zone with an absorbent which has a high selectivity for the inert gases contained in the gas mixture. A gas stream containing hydrogen, carbon monoxide, carbon dioxide and a reduced quantity of inert gases is withdrawn from the adsorption zone and is recycled to the reaction zone. As indicated, the absorption medium should have a high selectivity for the inert gases in the uncondensed gas stream. In the reaction of hydrogen with carbon oxide, particularly where the principal product is methanol, the principal impurity will be methane. Therefore, a solvent or absorbent having a high selectivity for methane should be employed. (Also, the absorbent should not interfere with the synthesis reaction.) Such solvents include the lower aliphatic alcohols. Since methanol has the highest selectivity for methane, its use is preferred.

Since the efficiency of the absorption medium is decreased as the concentration of absorbed inert gases is increased, it is necessary to remove the absorbed inert gases if the absorption medium is to be recycled. According to the present invention, the absorbed inert gases are removed by withdrawing the rich absorption medium from the absorption zone, reducing the pressure and flashing off the absorbed impurities. In order to minimize loss of absorption medium the flashing operation is preferably carried out in at least two stages. As indicated, the reaction zone and the absorption zone operate at approximately the same pressure, i.e., above 3000 p.s.i.g. and usually between about 4000 and about 6000 p.s.i.g. In the first flashing zone, therefore, the pressure is dropped below the pressure prevailing in the absorption zone and usually to a pressure between about 300 and 5000 p.s.i.g. The absorption medium is withdrawn from the first separation or flash zone and is passed to a second separation or flash zone where the pressure is further reduced below the pressure prevailing in the first separation zone and usually between atmospheric pressure and 500 p.s.i.g. and preferably at a pressure approaching atmospheric. The lean absorbent medium, substantially free of absorbed gases, is re-pressured and recycled to the absorption zone. The presence of water in quantities above about 10 percent adversely affects the absorption efficiency of methanol. Hence, the about of water in the absorption medium should not be permitted to exceed 10 percent and preferably, for maxium absorption efficiency, should not be permitted to exceed 2 percent. To control the concentration of water, a portion of the methanol recycle stream is continuously withdrawn and combined with the crude methanol product stream. Fresh methanol is added to compensate for the methanol withdrawn.

For a specific embodiment of the operation of the process of this invention, reference may be had to FIGURE 1 of the drawings. Approximately 6,263 pounds per hour of a gas mixture containing hydrogen and carbon monoxide in approximately 2.6:1 mol ratio, is passed from line 10 to line 11 at a temperature of 100° F. and a pressure of 5,245 p.s.i.g. Approximatley 22,617 pounds per hour of recycle gas, described more fully below, at a temperature of 117° F. and a pressure of 5,245 p.s.i.g. is passed from line 12 to line 11. The admixture of feed and recycled gases flows through line 11 to knock-out drum 13 which serves to remove oil picked up from the various compression stages. Approximately 28,880 pounds per hour of admixed feed and recycle gas at a temperature of 113° F. and a pressure of 5,145 p.s.i.g. is withdrawn from knock-out drum 13 through line 14. The composition of the feed gas, the recycle gas and the resulting admixture of feed and recycle is given below in table I.

TABLE I

Composition of Gas Streams

|  | Feed | Recycle | Admixture |
|---|---|---|---|
| $H_2$ | 336.0 | 1,907 | 2,243 |
| CO | 128.9 | 113.7 | 242.6 |
| $CO_2$ | 11.1 | 6.4 | 17.5 |
| $CH_4$ | 68.5 | 686 | 754.5 |
| $C_2H_4$ | 2.4 |  | 2.4 |
| $C_2H_6$ |  | 23.1 | 23.1 |
| A |  | 8.2 | 86.5 | 94.7 |
| $H_2O$ |  |  |  |
| $CH_3-O-CH_3$ |  | 1.9 | 1.9 |
| $CH_3OH$ |  | 2.3 | 2.3 |
| Total mph | 555.1 | 2,826.9 | 3,382 |
| Total #/hr | 6,263 | 22,617 | 28,880 |

The gas stream in line 14 is then passed through methanol converter 15. The methanol converter contains about 6000 pounds of standard 50:50 (weight ratio) zinc oxide-chromium oxide gel catalyst. Reaction temperature is about 675° F.

A converter effluent stream having the composition given in table II is withdrawn from the methanol converter through line 16 at reaction temperature and a pressure of about 5045 p.s.i.g.

TABLE II

Reactor Effluent Stream

| | |
|---|---|
| $H_2$ | 1,977 |
| CO | 122.5 |
| $CO_2$ | 10.2 |
| $CH_4$ | 756.0 |
| $C_2H_4$ | ------ |
| $C_2H_6$ | 25.5 |
| A | 94.7 |
| $H_2O$ | 12.0 |
| $CH_3-O-CH_3$ | 5.2 |
| $CH_3OH$ | 121.3 |
| Total m.p.h. | 3,124.4 |
| Total #/hr. | 28,880 |

The hot reactor effluent passes through line 16 to heat exchanger 29 where it is cooled to approximately 290° F. From heat exchanger 29 the reactor effluent passes through line 18 and into cooler 19 where it is further cooled to a temperature of 100° F. From cooler 19, the reactor effluent passes through line 20 to product trap-out section 21 contained in column 22. For purposes of convenience, the product trap-out section and the absorption section are combined into one vessel. It is to be understood, however, that the product trap-out section can be operated separately from the absorption section. In product trap-out section 21, condensed products are separated from uncondensed inert and reactive gases. A condensed stream is withdrawn from the bottom of trap-out section 21 through line 23 containing pressure control valve 24. This stream is introduced into liquid-vapor separator 25 at a pressure of about 35 p.s.i.g. A crude methanol product is withdrawn from liquid-vapor separator 25, combined with purge and removed through line 26. This combined stream is further purified by standard processes to produce a pure methanol product. The composition of the condensed stream withdrawn from trap-out section 21 and the composition of the combined crude product and purge streams withdrawn from line 26 is given below in Table III.

TABLE III

|  | Trap-Out Effluent | Combined Product Stream |
|---|---|---|
| $H_2$ | 6.0 |  |
| CO | 0.4 |  |
| $CO_2$ | 0.4 | 0.1 |
| $CH_4$ | 4.0 | 0.1 |
| $C_2H_4$ |  |  |
| $C_2H_6$ | 0.2 |  |
| A | 0.4 |  |
| $H_2O$ | 11.9 | 12.0 |
| $CH_3$—O—$CH_3$ | 1.2 | 0.8 |
| $CH_3OH$ | 119.0 | 127.9 |
| Total m.p.h. | 143.5 | 140.9 |
| Total #/hr | 4,212 | 4,356 |

Approximately 190 pounds per hour of vapor is withdrawn from the top of liquid-vapor separator 25 and is passed through line 28 to line 41 to recover uncondensed methanol as discussed more fully below.

A vaporous overhead leaves product trap-out section 21 through bubble cap 34 (shown schematically) and enters absorption zone 30. Absorption zone 30 is filled with approximately 3500 pounds of Raschig rings of about 1½ inch diameter. The vaporous overhead from product trap-out section 21 is countercurrently contacted with approximately 57,303 pounds of lean methanol which is introduced into the absorber through line 31. A vaporous overhead is withdrawn from absorption zone 30 through line 32 at a temperature of 100° F. and a pressure of 5005 p.s.i.g. This stream is passed from line 32 to compressor 33 where it is compressed to 5245 p.s.i.g. The compressed stream leaves compressor 33 through line 12 where it is admixed with feed as discussed above.

Approximately 59,354 pounds per hour of rich methanol is withdrawn from the bottom of absorption zone 30 through line 35 which contains pressure reducing valve 36. Pressure of this rich methanol stream is reduced from absorption zone pressure to approximately 2985 p.s.i.g. The depressured rich methanol stream continues through line 35 and enters liquid-vapor separator 37. As indicated previously, the feed gas in this example is prepared by a partial combustion process and, therefore, contains argon. In order to remove argon from the system, the vaporous overhead from liquid-vapor separator 37 is discharged through line 38 which contains pressure control valve 39. In this case, valve 40 is closed. In the event that the vaporous overhead from liquid-vapor separator 37 does not contain argon, then, in order to conserve methanol, the overhead from line 38 is passed to line 41 where it is treated as discussed more fully below. The composition of the gas which is purged from the system through line 38 and pressure control valve 39 is given below in Table IV.

TABLE IV

|  | Purge gas |
|---|---|
| $H_2$ | 29.7 |
| CO | 2.5 |
| $CO_2$ | 0.1 |
| $CH_4$ | 16.7 |
| $C_2H_6$ | 0.5 |
| A | 2.0 |
| $CH_3$—O—$CH_3$ | 0.1 |
| $CH_3OH$ | 0.1 |
| Total m.p.h. | 51.7 |
| Total #/hr. | 505 |

Condensed methanol is withdrawn from the bottom of liquid-vapor separator 37 through line 42 containing pressure reducing valve 43 and is introduced into liquid-vapor separator 44 at a pressure of 35 p.s.i.g. Approximately 1943 pounds per hour of vapor are withdrawn from the top of liquid-vapor separator 44 through line 45 and introduced into line 41 where it is combined with the vaporous overhead from liquid-vapor separator 25 flowing through line 28. (If the overhead from liquid-vapor separator 37 does not contain argon, it is combined with the vaporous streams in lines 45 and 28.) The combined streams in line 41 are passed through heat exchanger 46 where they are cooled from 100° F. to −10° F. From heat exchanger 46 the cooled stream flows through line 47 to liquid-vapor separator 48. A vaporous overhead fraction having the composition given in Table V is withdrawn from separator 48 through line 49.

TABLE V

|  | Low pressure flash gas |
|---|---|
| $H_2$ | 40.3 |
| CO | 6.2 |
| $CO_2$ | 3.7 |
| $CH_4$ | 53.2 |
| $C_2H_6$ | 1.9 |
| A | 6.2 |
| $CH_3$—O—$CH_3$ | 2.4 |
| $CH_3OH$ | 0.3 |
| Total m.p.h. | 114.2 |
| Total #/hr. | 1699 |

Condensed methanol is withdrawn from separator 48 through line 50 and is returned to separator 44. Lean methanol is withdrawn from separator 44 through line 53, re-pressured by pump 51, withdrawn from pump 51 through line 31 and returned to absorption zone 30. In order to control the concentration of water in the methanol absorbent, approximately 334 pounds per hour of lean methanol are withdrawn from line 53 through line 27 and are combined with crude methanol product in line 26. As indicated previously, high concentrations of water in the methanol absorbent decrease absorption efficiency. In this particular case, the methanol purged is adjusted to maintain the water concentration at about 2.0 mol percent. Approximately 298 pounds per hour of pure methanol (from a methanol purification unit not shown) is introduced through line 52 to line 53 to make up for the withdrawn methanol.

In an embodiment of the invention, not illustrated in the drawing, the energy released by de-pressuring the rich methanol stream from the absorption zone is used to supply part of the energy required to operate the re-pressuring pump 51. In this connection, the high pressure stream leaving the absorption zone through line 35 is passed through an expansion engine instead of pressure reducing valve 36. The withdrawn stream now at reduced pressure is passed to liquid-vapor separator 37 as before. The intermediate pressure stream flowing through line 42 is also passed to an expansion engine instead of pressure reducing valve 43, and this stream at reduced pressure is introduced into liquid-vapor separator 44. By employing expansion engines in these lines, the cost of re-pressuring the methanol stream is considerably reduced.

Various modifications and alterations of the process of this invention will be apparent to those skilled in the art, and may be used without departing from the scope of the invention.

Having thus described my invention, I claim:

1. A process for treating an effluent from a methanol synthesis reaction zone containing methanol, water, hydrogen and inert gases which comprises passing said effluent to a separation zone, withdrawing a condensed methanol and water fraction from said separation zone, withdrawing an uncondensed fraction containing hydrogen and inert gases from said separation zone, passing said uncondensed fraction to an absorption zone, contacting said uncondensed fraction in said absorption zone with a methanol stream having a lower concentration of water than said condensed methanol and water fraction thereby absorbing a portion of said inert gases, withdrawing a gas mixture containing hydrogen and a reduced quantity of inert gases from said absorption zone and recycling said withdrawn gas mixture containing hydrogen to said methanol synthesis reaction zone.

2. A process for treating an effluent from a methanol synthesis reaction zone containing methanol, water, hydrogen and methane which comprises passing said effluent to a separation zone, withdrawing a condensed methanol and water fraction from said separation zone, withdrawing an uncondensed fraction containing hydrogen and methane from said separation zone, passing said uncondensed fraction to an absorption zone, contacting said uncondensed fraction in said absorption zone with a methanol stream having a lower concentration of water than said condensed methanol and water fraction thereby absorbing a portion of said methane, withdrawing rich methanol containing absorbed methane from said absorption zone, removing absorbed methane from said withdrawn rich methanol to produce regenerated methanol, recycling regenerated methanol to said absorption zone, withdrawing a gas mixture containing hydrogen and a reduced quantity of methane from said absorption zone and recycling said withdrawn gas mixture containing hydrogen to said methanol synthesis reaction zone.

3. A process according to claim 2 in which said uncondensed fraction containing hydrogen and methane further contains water, in which said rich methanol containing absorbed methane further contains absorbed water and in which a portion of said regenerated methanol is diverted from the process and fresh methanol is added to the process in order to control the concentration of water in the methanol stream introduced into said absorption zone.

4. A process according to claim 2 in which the step of removing absorbed methane from said withdrawn rich methanol to produce regenerated methanol is carried out by passing said withdrawn rich methanol through a plurality of zones of successively reduced pressure thereby flashing said absorbed methane from said methanol.

5. A process according to claim 4 in which said plurality of zones of successively reduced pressure consists of two separation zones in each of which methane is flashed from the methanol.

6. A process according to claim 5 in which the concentration of water in said methanol stream which is introduced into said absorption zone does not exceed 10 percent.

7. A process according to claim 5 in which the concentration of water in said methanol stream which is introduced into said absorption zone does not exceed 2 percent.

8. A process for treating an effluent from a methanol synthesis reaction zone containing methanol, water, hydrogen and methane which comprises cooling said effluent to a temperature between about 80° F. and about 125° F. thereby condensing methanol and water, passing said cooled effluent to a separation zone, withdrawing a condensed methanol and water fraction from said separation zone, withdrawing an uncondensed fraction containing hydrogen, methane and water from said separation zone, passing said uncondensed fraction to an absorption zone maintained at a temperature between about —50° F. and about 125° F. and a pressure above 3000 p.s.i.g., contacting said uncondensed fraction in said absorption zone with a methanol stream having a lower concentration of water than said condensed methanol and water fraction thereby absorbing a portion of said methane and water, withdrawing a gas mixture containing hydrogen and a reduced quantity of methane from said absorption zone, recycling said gas mixture to said methanol synthesis reaction zone, withdrawing methanol enriched with methane and water from said absorption zone, passing said enriched methanol to a second separation zone maintained at a pressure between about 300 and about 5000 p.s.i.g. and below the pressure prevailing in the absorption zone thereby flashing at least a portion of said absorbed methane from said methanol, withdrawing methanol containing a reduced quantity of methane from said second separation zone, passing said withdrawn methanol to a third separation zone maintained at a pressure between about atmospheric and about 500 p.s.i.g. and below the pressure prevailing in said second separation zone thereby flashing an additional portion of absorbed methane from said methanol, withdrawing said methanol from said third separation zone, diverting a portion of said withdrawn methanol from the process to prevent the buildup of water, repressuring another portion of said withdrawn methanol to the pressure prevailing in said absorption zone and recycling the same to said absorption zone.

References Cited in the file of this patent

UNITED STATES PATENTS

| | | |
|---|---|---|
| 1,754,371 | Stengel | Apr. 15, 1930 |
| 2,250,925 | Babcock | July 29, 1941 |
| 2,371,817 | Frey | Mar. 20, 1945 |
| 2,685,941 | Kassel | Aug. 10, 1954 |
| 2,881,053 | Bowers | Apr. 7, 1959 |

OTHER REFERENCES

"Solubilities of Inorganic and Organic Compounds," by Seidell, volume 1, 2nd edition, D. Van Nostrand Inc., pages 319, 432.

Thorpe's Dictionary of Applied Chemistry, 4th edition, volume 1, page 464, 1st column, Longmans, Green and Co., New York, N.Y.